UNITED STATES PATENT OFFICE.

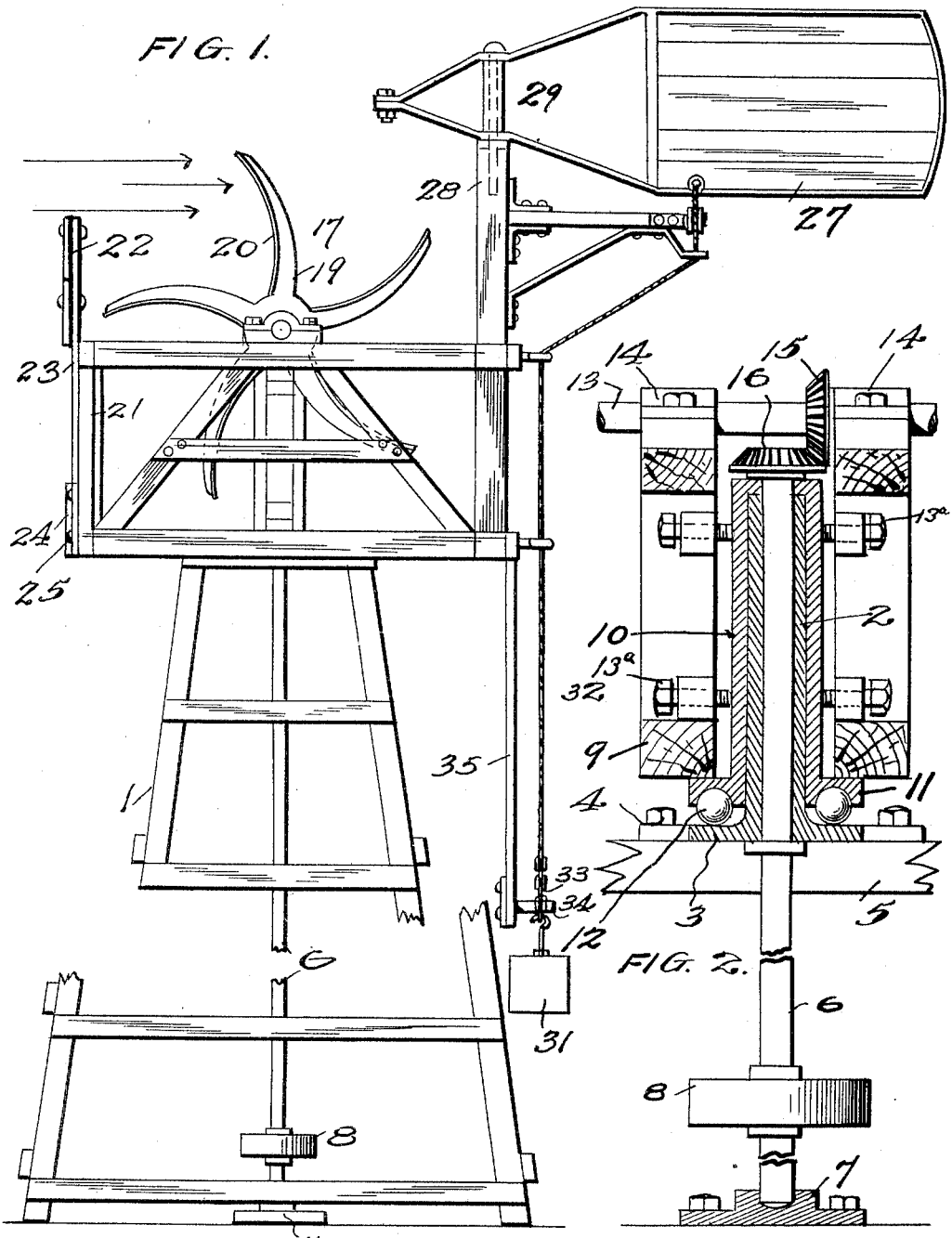

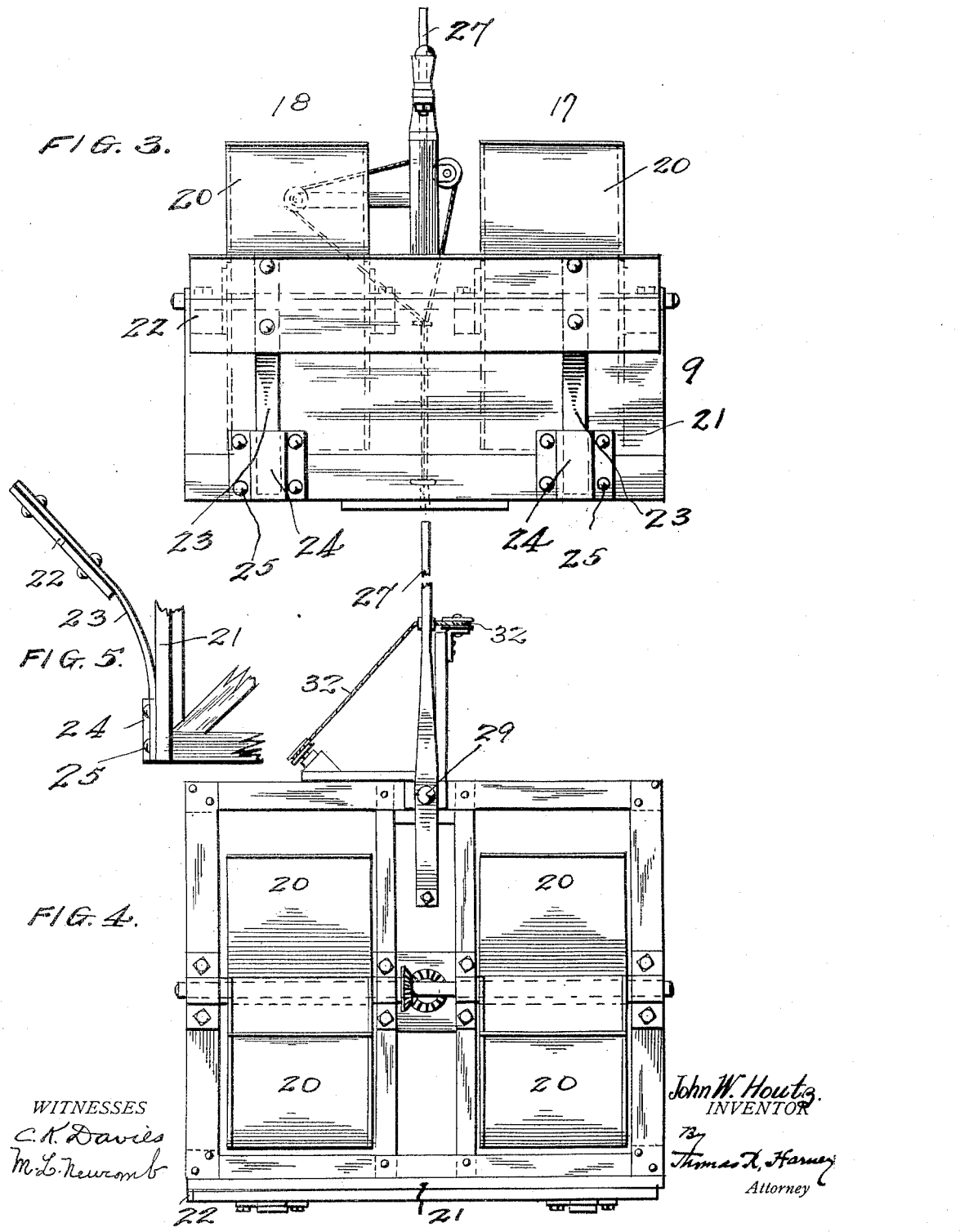

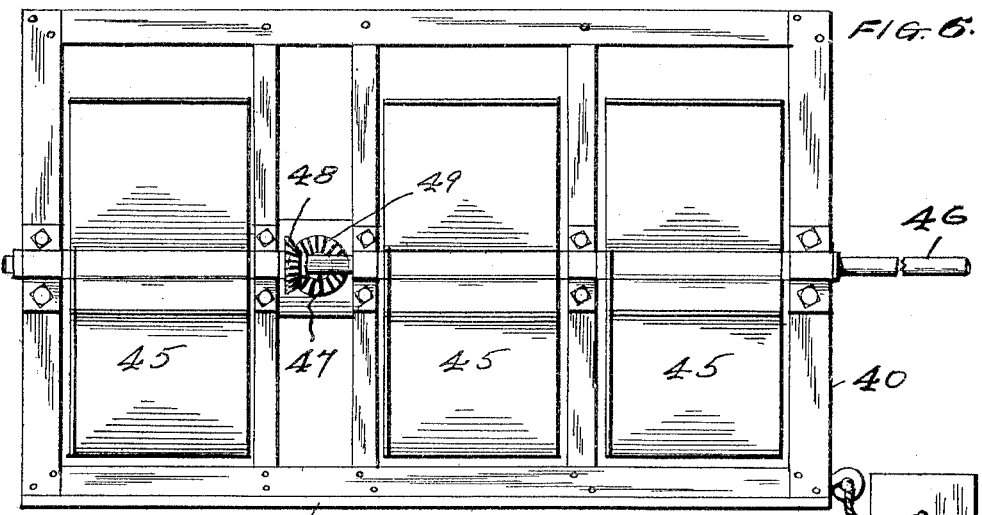
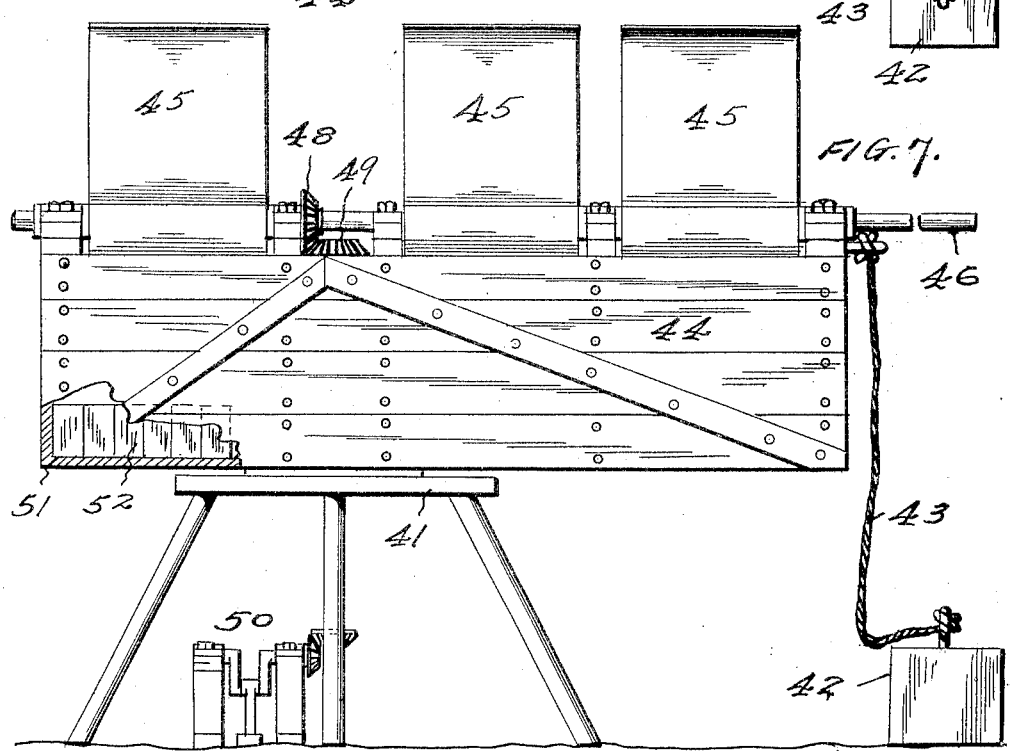

JOHN W. HOUTZ, OF PORTALES, NEW MEXICO.

WIND-WHEEL.

1,099,602.  Specification of Letters Patent.  Patented June 9, 1914.

Application filed March 15, 1913. Serial No. 754,527.

*To all whom it may concern:*

Be it known that I, JOHN W. HOUTZ, a citizen of the United States, residing at Portales, in the county of Roosevelt and State of New Mexico, have invented certain new and useful Improvements in Wind-Wheels, of which the following is a specification.

My invention relates to improvements in wind wheels and is particularly designed to provide a power operated transmission device capable for use in connection with pumps, etc.

The object of the invention is to simplify the construction and operation of devices of this character, render them more durable, and furnish an apparatus more efficient and economical in attaining the results required of a comparatively perfect machine of this type.

The invention consists in certain novel combinations and arrangements of parts as hereinafter set forth and claimed.

In the accompanying drawings I have illustrated one complete example, and a modification thereof, constructed according to the best mode I have so far devised for the practical application of the principles of my invention.

Figure 1 is a side elevation of a wind wheel embodying my invention. Fig. 2 is a vertical central sectional view of the vertical shaft and its bearing, showing the driving shaft connection. Fig. 3 is a front elevation of the wind wheel, the tower or platform omitted for convenience of illustration. Fig. 4 is a top plan view of Fig. 3. Fig. 5 is a detached, detail view showing the flexible wind shield used in connection with the weir. Fig. 6 is a top plan view of a modification of the invention. Fig. 7 is a front elevation of Fig. 6.

The embodiment of my invention illustrated in Figs. 1 through 5 utilizes a platform or tower 1 upon which is fixed at the top the sleeve 2, formed with a flange 3 which is secured by bolts 4 to the top bars 5 of the tower. Within the sleeve 2 the vertical countershaft 6 is journaled, and at its lower end this shaft is stepped in the base plate 7 and provided with a pulley 8, for the transmission of power.

The sleeve 2 forms a pivot about which the rotatable frame 9 may turn. This frame is constructed preferably of suitable wood and is formed of cross bars and uprights in usual manner, and securely and rigidly held together by nails or bolts. The frame is adapted to rotate about the sleeve 2, and to provide for this movement a second and larger sleeve 10 is provided. The sleeve 10 is formed with a base flange 11, and between this base flange and the flange 3 of the sleeve 2, a ball bearing 12 is interposed to provide a smooth turning of the rotary frame.

The sleeve 10 forms a bearing or casing around the sleeve 2, and the bolts 13$^a$ are provided to adjust the sleeve 10 with relation to the frame 9 and to take up wear of parts.

The revoluble platform or frame 9 supports the main or drive shaft 13 in bearings 14, 14, and the vertical countershaft 6 is driven from the main shaft by means of the bevel gears 15 and 16. Upon the shaft 13 at each side of the shaft 6 are fixed a pair of wheels as 17, 18, each formed with a spider 19 comprising five arms in pairs, and the arms of each pair are connected by a web or paddle 20. These spider arms and their webs are curved in concave formation as shown in Fig. 1, and the wheels are located back of a wall or barrier 21, in the form of a weir, so that the wind may strike only the upper half of the wheels when the wheels are in operative position. The weir is built across the front of the revoluble frame 9, and obscures from the wind currents the lower portion of the wheels 17 and 18. An additional wind shield 22 is secured in the cleats or sockets 23 on the weir 21 by means of the spring arms 24. The cleats are secured by bolts 25 and anchor the shield so that as the currents of air increase or diminish, the shield may be moved upwardly in front of and above the weir to shield the wheels against the tension of the spring arms, which arms return the shield to normal position when the wind pressure is reduced.

In some instances a vane 27 is supported on the post 28 by the pivot 29 to hold the revoluble platform in predetermined position with relation to the direction of wind currents. By means of weight 31 and cords 32 connected to the vane, the vane may be brought to desired angle to the plane of the front wall, so that a greater or less area of the weir and wheels may be presented to the wind to adapt the work required to the strength or pressure of the wind currents.

The vane may be held in position by hooking the weight in a link of chain 33 which forms a portion of the cord 32 and is passed around a pin 34 fixed in the supporting leg 35 secured to the revoluble frame.

In Figs. 6 and 7 I have illustrated a modified form of the invention wherein the revoluble platform 40 is adapted to turn upon the table 41, but the rotary movement of the platform is limited by a weight or anchor 42 attached to the platform by cord 43 and resting on the ground. The weir or wall 44, wind wheels 45 and shafts 46 and 47 with their bevel gears 48, 49 are similar to those used in the first form, and a pump 50 is illustrated as operated by the wind wheels. It will be noted however that the wheels are unequally distributed on the shaft 46 at the sides of shaft 47. To compensate for the greater pressure at the right side, from air currents, the weight is utilized, and to counterbalance the weight of the added wheels, a box 51 with variable weights 52 is provided at the opposite side from the added wheel. To compensate for the weight of additional wheels if required, the weights 52 may be increased accordingly.

Having thus fully described my invention, what I claim as new and desire to secure by Letters Patent is:—

1. The combination with wind wheels and a supporting member therefor, a shield fixed in front of said wheels and cleats attached to said shield, of an adjustable shield having a plurality of supporting spring arms attached thereto and having their free ends fixed in sockets, to adapt the wheels to varying pressures of air currents.

2. The combination with a revoluble frame and its wind wheels, a movable vane, a weight suspended on the frame and a cord connecting the vane and weight to adapt the frame to changes in the direction of the wind and sockets fixed to the frame, of an adjustable shield having a plurality of metallic spring arms fixed thereto and having the free ends of said arms seated in said sockets, to adapt the wheels to varying pressures of air currents.

In testimony whereof I affix my signature in presence of two witnesses.

JOHN W. HOUTZ.

Witnesses:
ISAAC CORHN,
A. G. TROUTT.

---

Copies of this patent may be obtained for five cents each, by addressing the "Commissioner of Patents, Washington, D. C."